(12) United States Patent
Bejerasco et al.

(10) Patent No.: US 9,787,712 B2
(45) Date of Patent: Oct. 10, 2017

(54) CONTROLLING A DOWNLOAD SOURCE OF AN ELECTRONIC FILE

(71) Applicant: F-Secure Corporation, Helsinki (FI)

(72) Inventors: Christine Bejerasco, Helsinki (FI); Karmina Aquino, Helsinki (FI)

(73) Assignee: F-Secure Corporation, Helsinki (FI)

(*) Notice: Subject to any disclaimer, the term of this patent is extended or adjusted under 35 U.S.C. 154(b) by 84 days.

(21) Appl. No.: 14/742,810

(22) Filed: Jun. 18, 2015

(65) Prior Publication Data

US 2015/0371043 A1    Dec. 24, 2015

(30) Foreign Application Priority Data

Jun. 23, 2014 (GB) .................................. 1411140.5

(51) Int. Cl.

| G06F 11/00 | (2006.01) |
|---|---|
| G06F 12/14 | (2006.01) |
| G06F 12/16 | (2006.01) |
| G08B 23/00 | (2006.01) |
| H04L 29/06 | (2006.01) |
| G06F 21/51 | (2013.01) |

(52) U.S. Cl.
CPC ............ *H04L 63/145* (2013.01); *G06F 21/51* (2013.01)

(58) Field of Classification Search
CPC ......... G06F 2221/033; G06F 2221/034; G06F 21/52; H04L 63/1441; H04L 63/1408
USPC .......................................................... 726/22
See application file for complete search history.

(56) References Cited

U.S. PATENT DOCUMENTS

| 8,112,412 B1 | 2/2012 | Nachenberg .................. 707/710 |
|---|---|---|
| 9,043,919 B2* | 5/2015 | Wyatt .................. G06F 21/564 |
| | | 707/708 |
| 2006/0253584 A1 | 11/2006 | Dixon et al. .................. 709/225 |
| 2011/0016533 A1 | 1/2011 | Zeigler et al. .................. 726/26 |
| 2012/0117650 A1 | 5/2012 | Nachenberg .................... 726/24 |
| 2012/0240236 A1* | 9/2012 | Wyatt .................. G06F 21/564 |
| | | 726/25 |

* cited by examiner

*Primary Examiner* — Kambiz Zand
*Assistant Examiner* — Stephen Sanders
(74) *Attorney, Agent, or Firm* — Harrington & Smith

(57) ABSTRACT

A method and apparatus for controlling a download source for an electronic file. The method includes at a server, receiving from a user device an identity of a first source from which the user device wishes to obtain the electronic file. The received identity of the first source is compared with an identity of a known reputable source associated with the electronic file. If the first source and the known reputable source do not match, a message is sent to the user device that includes the identity of the reputable source.

6 Claims, 6 Drawing Sheets

CONTROLLING A DOWNLOAD SOURCE OF AN ELECTRONIC FILE

TECHNICAL FIELD

The invention relates to controlling a download source of an electronic file.

BACKGROUND

Malware infection of computers and computer systems is a growing problem. There have been many high profile examples where computer malware has spread rapidly around the world causing many millions of pounds worth of damage in terms of lost data and lost working time.

Malware is often spread using a computer virus. Early viruses were spread by the copying of infected electronic files onto floppy disks, and the transfer of the electronic file from the disk onto a previously uninfected computer. When the user tries to open the infected electronic file, the malware is triggered and the computer infected. More recently, viruses have been spread via the Internet, for example using e-mail. It is also known for viruses to be spread by the wireless transmission of data, for example by communications between mobile communication devices using a cellular telephone network.

Various anti-virus applications are available on the market today. These tend to work by maintaining a database of signatures or fingerprints for known viruses and malware. With a "real time" scanning application, when a user tries to perform an operation on a file, e.g. open, save, or copy, the request is redirected to the anti-virus application. If the application has no existing record of the electronic file, the electronic file is scanned for known virus or malware signatures. If a virus or malware is identified in a file, the anti-virus application reports this to the user, for example by displaying a message in a pop-up window. The anti-virus application may then add the identity of the infected file to a register of infected files.

In recent years, so called "application stores" have proved to be very popular with mobile users. Apple® App Store and Android® Market are two examples of application stores. An application store is an online service that allows a user to browse and download software applications from a remote server to their device.

Applications are frequently free or very low cost, and a successful application can be downloaded to millions of devices. Other application stores include SOFTONIC, FILEHIPO, AND CNET.

While the same software application may be available from another source, the convenience of an application store means that the great majority of downloads of a software application are made using an app store.

Infection with malware can occur via a variety of routes, including computer viruses and email. Infection can also occur via the direct downloading of unsafe files by a user. The likelihood of such direct downloads is increased by the fact that popular files and software are often mimicked by malware and other potentially unwanted software in order to deceive the user into installing them.

A simple way of tricking users into installing malware is to provide the malware in the form of an application that appears to perform a desirable function for the user. This type of malware is known as a Trojan horse, or Trojan. While the Trojan horse appears to perform a desirable function for the user, it contains malicious code. The malicious code may be executed in addition to performing the desirable function, so the user is not aware that his computer device is running a Trojan horse. A Trojan horse may be used, for example, to display unwanted advertisements or allow a malicious third party to access the computer device and perform unwanted operations such as contacting premium rate numbers, stealing data, installing unwanted software, modifying or removing existing files and so on. Other methods of deception range from exploiting obvious typographical errors in filenames to divert a user to a covert malware file, accessing internet content without any intervention from the browser or user and obtaining a file with a similar filename, similar details or even a certificate similar to that of a popular file.

Application stores that host and facilitate the downloading of popular software may therefore be targeted by the creators of malware, and thus may host a mixture of safe, suspicious and malicious content. The reputation systems employed by these sites must attempt to determine the safety, or lack thereof, of every application hosted on the site, and the time between the upload of a malicious application and its detection may be long enough for the malware to be downloaded by a user. The crawler and analysis methods used by these sites to identify malware can be time consuming, resource intensive, and, as described above, may ultimately be ineffective in their goal of preventing the downloading of malware by users.

SUMMARY

A user may unwittingly attempt to download an electronic file that hosts a Trojan or other malware. It is an object to mitigate the problems described above by providing an extra layer of security that exploits existing knowledge about popular files.

According to a first aspect of the present invention there is provided a method of controlling a download source for an electronic file. The method comprises, at a server: receiving from a user device an identity of a first source from which the user device wishes to obtain the electronic file. The received identity of the first source is compared with an identity of a known reputable source associated with the electronic file. If the first source and the known reputable source do not match, a message is sent to the user device, the message including the identity of the reputable source. An advantage of this is that the user is alerted when attempting to download an electronic file from a source that may not be reputable.

The message may comprise a recommendation that the user device obtains the electronic file from the known reputable source.

The identity of the first source may comprise a Uniform Resource Locator, URL, the URL including a name of the electronic file.

The method may further comprise, prior to sending the message to the user device: receiving from the user device metadata extracted from the electronic file, and determining if any of the received metadata matches metadata associated with a version of the electronic file available from the known reputable source.

In the event that none of the received metadata matches metadata associated with a version of the electronic file available from the known reputable source, the method may further comprise determining a number of enquiries within a predetermined time period from user devices relating to the first source. If the number of enquiries exceeds a predetermined popularity threshold, a further analysis is performed on the electronic file available from the first source. If the number of enquiries does not exceed a predetermined popularity threshold, a normal file reputation handling process is performed.

The method may further comprise receiving from the user device an indication that the user device did not obtain the electronic file from the known reputable source, and requesting further information about the electronic file from the user device for use in a reputation handling process. The further information about the obtained electronic file may comprise user feedback on the first source of the electronic file, the user feedback comprising a trust rating for the first source of the electronic file received from the user device.

According to a second aspect of the present invention there is provided a method of controlling a download source for an electronic file. The method comprises, at a user device, determining an identity of a first source from which the electronic file is available and sending to a remote server the identity of the electronic file and the identity of the first source. The user device then receives from the remote server a response message including an identity of a different, reputable source associated with the electronic file and from which the electronic file is available.

The method may further comprise, prior to receiving the response message, obtaining the electronic file from the first source, obtaining metadata relating to the electronic file, and sending the obtained metadata to the server. The metadata may comprise any of a filename, a file description, a product name, a copyright owner, an original filename, a digital signature, a developer name, a package name, an original domain and a hash value.

The method may further comprise, after receiving the response message, obtaining the electronic file from the first source, and sending to the server a further message. The further message includes information about the obtained electronic file. The information about the obtained electronic file may comprise user feedback on the first source of the electronic file, the user feedback comprising for example a trust rating for the first source of the electronic file provided by a user.

The method may further comprise, after receiving the response message, preventing download from the first source, and obtaining the electronic file from the reputable source.

According to a third aspect of the present invention there is provided a server for use in a communications network. The server comprises a first receiver arranged to receiving from a user device an identity of a first source from which the user device wishes to obtain the electronic file. A processor is provided that is arranged to compare the received identity of the first source with an identity of a known reputable source associated with the electronic file. A first transmitter is provided for, in the event that the first source and the known reputable source do not match, sending to the user device a message including the identity of the reputable source.

The message may comprise a recommendation that the user device obtains the electronic file from the known reputable source.

The processor may be further arranged to determine an identity of the first source using a Uniform Resource Locator, URL, the URL including a name of the electronic file.

The server may further comprise a second receiver, arranged to, prior to sending the message to the user device, receive from the user device metadata extracted from the electronic file. The processor is further arranged to determine if any of the received metadata matches metadata associated with a version of the electronic file available from the known reputable source. In the event that none of the received metadata matches metadata associated with a version of the electronic file available from the known reputable source, the processor may be further arranged to determine a number of enquiries within a predetermined time period from user devices relating to the first source, and in the event that the number of enquiries exceeds a predetermined popularity threshold, the processor is arranged to perform a further analysis on the electronic file available from the first source and in the event that the number of enquiries does not exceed a predetermined popularity threshold, perform a normal file reputation handling process.

The server may further comprise a third receiver arranged to receive from the user device an indication that the user device did not obtain the electronic file from the known reputable source, and a second transmitter arranged to request further information about the electronic file from the user device for use in a reputation handling process.

According to a fourth aspect of the present invention there is provided a user device for use in a communications network. The user device comprises a processor arranged to determine an identity of a first source from which an electronic file is available, a first transmitter arranged to send to a remote server the identity of the electronic file and the identity of the first source, and a first receiver arranged to receive from the remote server a response message including an identity of a different, reputable source associated with the electronic file and from which the electronic file is available.

The user device may further comprise a second receiver arranged to, prior to receiving the response message, obtain the electronic file from the first source, wherein the processor is further arranged to obtain metadata relating to the electronic file. A second transmitter is arranged to send the obtained metadata to the server. The processor may be arranged to obtain metadata selected from any of a filename, a file description, a product name, a copyright owner, an original filename, a digital signature, a developer name, a package name, an original domain and a hash value.

The user device may further comprise a third receiver arranged to, after receiving the response message, obtain the electronic file from the first source. A third transmitter is arranged to send to the server a further message, the further message including information about the obtained electronic file. The information about the obtained electronic file may comprise user feedback on the first source of the electronic file, the user feedback comprising a trust rating for the first source of the electronic file provided by a user.

According to a fifth aspect of the present invention there is provided a computer program, comprising computer readable code which, when run on a server, causes the server to perform the method according to the first aspect of the present invention.

According to a sixth aspect of the present invention there is provided a computer program, comprising computer readable code which, when run on a user device, causes the user device to perform the method according to the second aspect of the present invention.

According to a seventh aspect of the present invention there is provided a computer program product comprising a computer readable medium and a computer program according to the fifth or sixth aspect of the present invention, wherein the computer program is stored on the computer readable medium.

According to an eighth aspect of the present invention there is provided a method of identifying a trusted download source for an electronic file. The method comprises downloading a copy of an electronic file to a user device from an unknown or untrusted download source and, at the user device, extracting metadata from the downloaded electronic file and sending the metadata to a server. Metadata is received at the server and the metadata compared with metadata extracted from known electronic files in order to identify the downloaded electronic file. The method further comprises, at the server, identifying a trusted download source for the downloaded electronic file based upon the identity of the file and sending to the user device a message including the identity of the trusted download source, and receiving the identity of the trusted download source at the user device and downloading a copy of the electronic file from that trusted download source, and deleting the previously downloaded copy.

DETAILED DESCRIPTION

Figure 1:
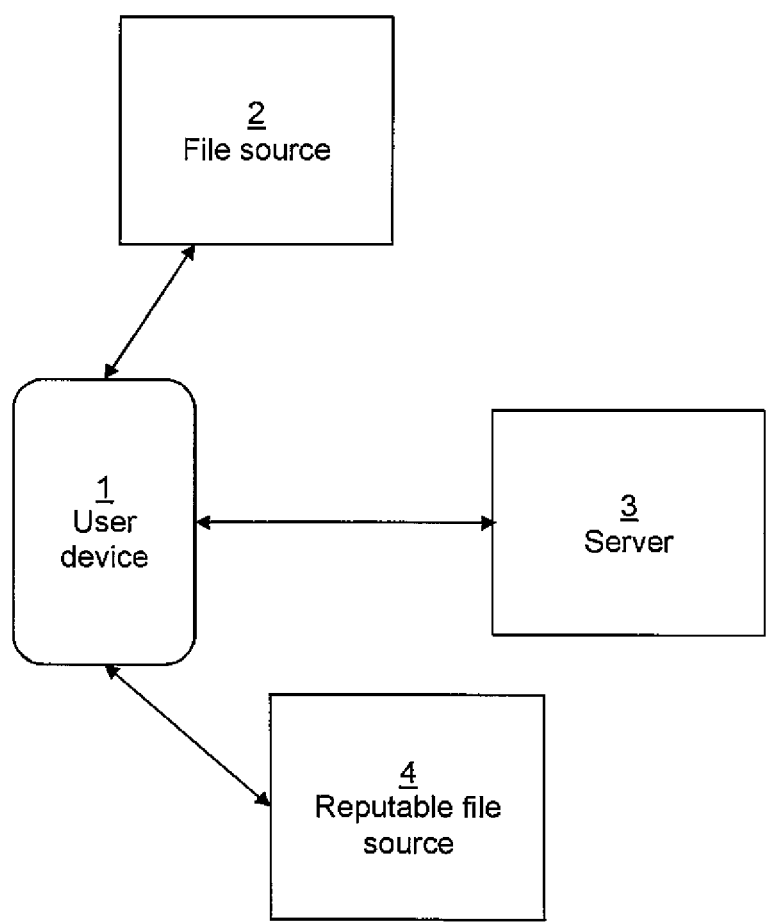
FIG. 1 illustrates schematically in a block diagram an exemplary network architecture.

FIG. 1 shows a simple network architecture in which a user device 1, such as a personal computer, smartphone, mobile phone, laptop or tablet, attempts to obtain an electronic file from a file source 2 such as an application store. The user device 1 is in communication with a server 3 and can also connect to a reputable file source 4. The devices may connect by any suitable communications network, for example via the Internet.

Known methods to protect a user from malicious electronic files by individually assessing the safety of each electronic file to be downloaded, or by scanning all files hosted on a site, can be time consuming and resource-intensive. There are proposed herein methods and apparatus to protect a user by attempting to direct the user to a reputable file source from which a safe, clean copy of the electronic file can be downloaded. This reduces the risk of malicious applications and software being downloaded to the user device 1. In an embodiment, information may be used that may already be available to the server 3, for example via a database. Because the server 3 collects hit counts and data on how many times files and applications are downloaded, information on the popularity of files, the popularity of websites, and associations between popular files and popular websites is already available. In an embodiment, all that is necessary is to use the known information to analyze user queries regarding the downloading of an electronic file. In this case, the server 3 can determine if the file being downloaded by the user is likely to be a mimic of a popular file. Alternatively, if a popular file is hosted somewhere different from a reputable file source 4, where the reputable source 4 may be, for example, an official site related to the electronic file, the server 3 can send a message to the user device including the identity of the reputable source; this message may recommend the reputable source 4 to the user device. Thus, the user can be given a choice to get as close to the official site as possible, and lessen the chances of downloading malware. By using prior knowledge on the original source of a file, which can be determined from file metadata, the user can be offered another layer of protection against potentially malicious files, and their online existence can be made more secure.

Figure 2A:
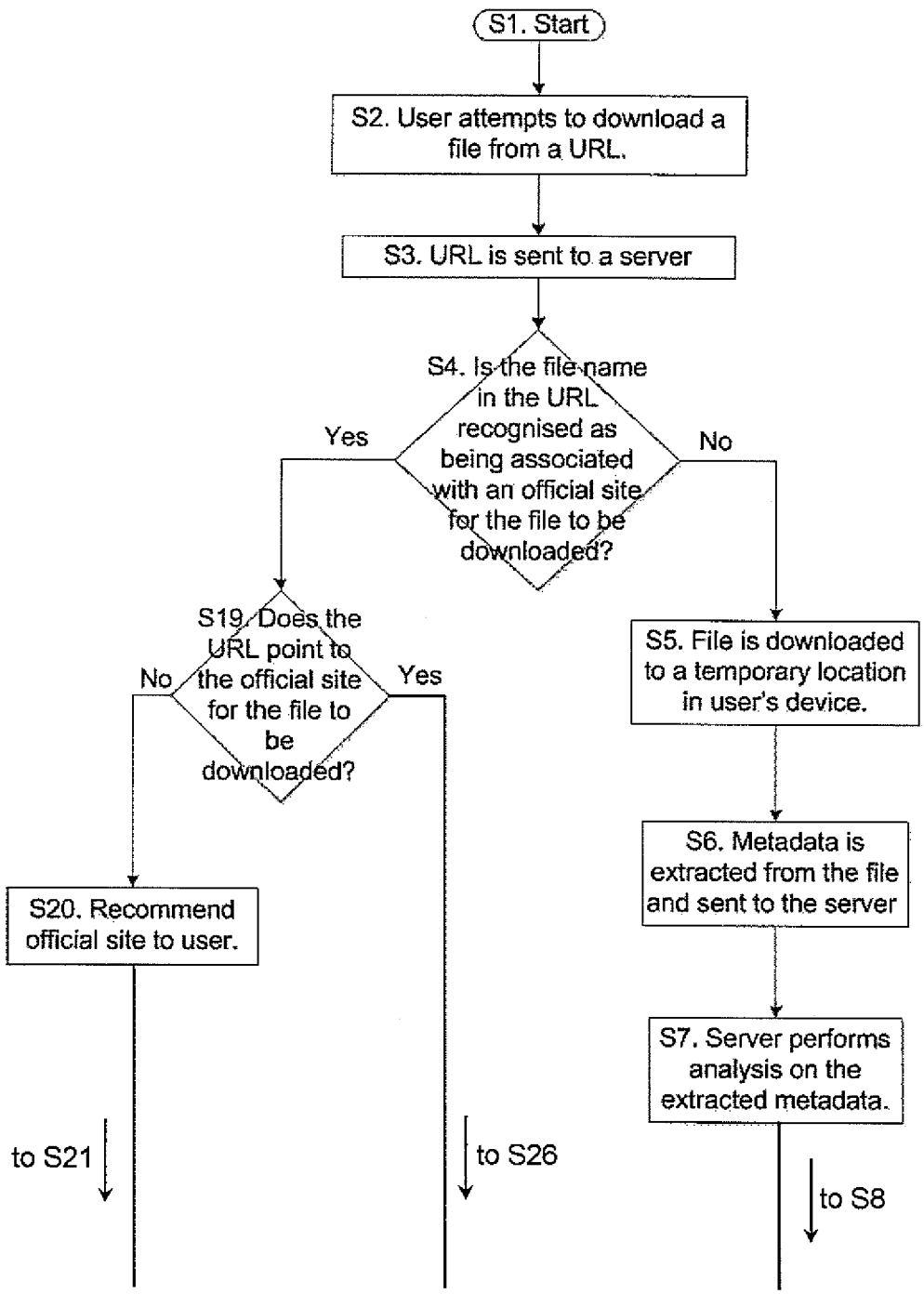
FIGS. 2a and b is a flow diagram showing exemplary steps.
Figure 2B:
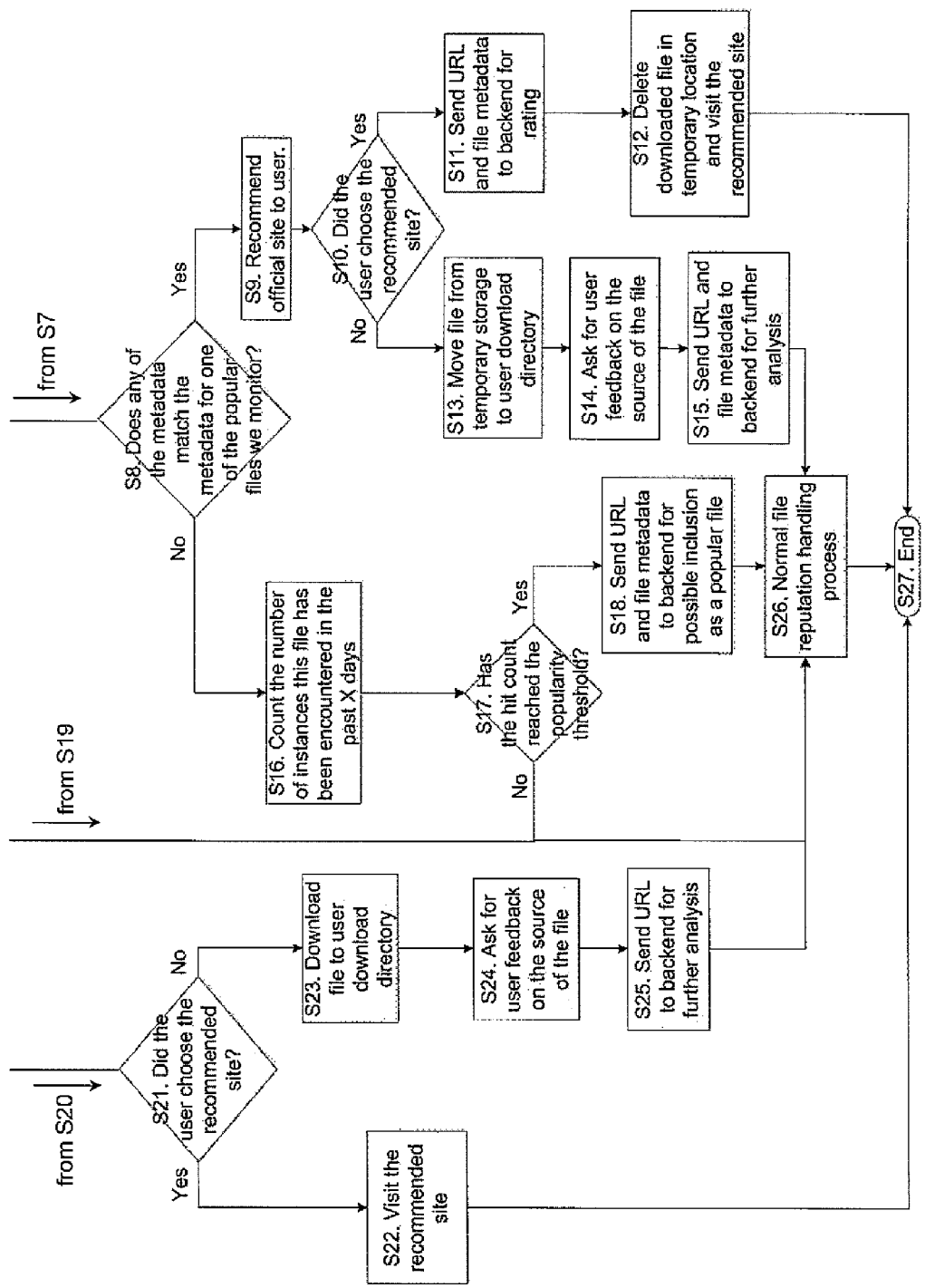

FIGS. 2a and b is a flow diagram that illustrates an exemplary method. In step S2 a user attempts to download an electronic file from a URL to the user device 1. The URL is then sent to the server 3 at step S3.

In step S4, at the server 3, a file name analysis is carried out to determine if the electronic file name in the URL is recognised as being associated with an official site for the electronic file. The official site is expected to provide a safe, clean copy of the electronic file. The electronic file name analysis may comprise a comparison between the electronic file name in the URL and a file name for a popular file, where the file names for popular files may be stored as data at a database accessible by the server (either at the server or at a remote database). The file name analysis methods may include typographical analysis, string matching and regular expressions. A popular electronic file may be a file that has been downloaded more than a certain number of times in a given time period. The server 3 stores an association between the file name for a popular file and an official site from which a clean, safe copy of the file can be downloaded. For example, the URL may include the file name "skype.exe". The file name analysis at the server might reveal that "skype.exe" is a popular file that has been downloaded many times, and that there is an association between the file name "skype.exe" and the official website for the Skype application, www.skype.com.

If the file name in the URL is recognised as being associated with an official site for the file to be downloaded at step S4, it is next determined at step S19 if the URL points to the official site for the file to be downloaded.

If the URL does point to the official site for the file to be downloaded, the download proceeds via a normal file reputation handling process at step S26.

If the URL does not point to the official site for the file to be downloaded, the official site for the file to be downloaded is recommended to the user device 1 at step S20. The recommendation may take the form illustrated in FIG. 3 or FIG. 4. The official website itself may be recommended to the user. If more options and other reputable sources are available from the official developer of an application that is associated with the file, an official site detailing these options may be recommended to the user. The further options and other reputable sources may include, for example, websites such as Softpedia and Majorgeeks. Alternatively, the user may be informed of the identity of the official site for the file to be downloaded.

If the user chooses the recommended official site for the file to be downloaded (as determined at step S21), at step S22 the recommended official site for the file to be downloaded is visited and the file is downloaded from said recommended official site for the file to be downloaded.

If the user does not choose the recommended official site for the file to be downloaded (as determined at step S21), at step S23 the file is downloaded to a user download directory in the user device 1. The user is then asked for feedback on the source of the file at step S24, and at step S25 the URL is sent to a backend system for further analysis. The feedback requested from the user may include the user's level of trust in the source of the file. In particular, the user may be asked to rate how much he/she trusts the source of the file on a scale from 1 to 5. If many users provide high trust ratings for the source of a file (i.e. if the number of trust ratings exceeding a predetermined level and received from different user devices exceeds a predetermined number) and the backend system has not found the source to be suspicious, the source of the file may be added as a trusted source. The download then proceeds via a normal file reputation handling process at step S26.

If the file name in the URL is not recognised as being associated with an official site for the file to be downloaded at step S4, then alternative means are used to identify the file, and hence identify an official site and recommend it to the user.

At step S5, the file is downloaded to a temporary location in the user device 1, and at step S6 metadata is extracted from the file and sent to the server. Examples of metadata may include a filename, a file description, a product name, a copyright holder or copyright information, an original filename, a name of a signer, developer name(s), a package name, information identifying an electronic signature used to sign the electronic file, an original domain and/or an alternate download URL. Different metadata may be available depending on the nature of the electronic file and the platform (e.g. the Operating System) from which the user device 1 is attempting to obtain the electronic file.

In steps S7 and S8, the server 3 performs an analysis on the metadata to determine whether any of the metadata extracted from the file matches any of the metadata accessible by the server 3 for a popular file. The methods used for this analysis may be common methods that are already applied at the server 3 for different purposes. The analysis may comprise a comparison between the metadata extracted from the electronic file and the metadata stored for a popular file, where the metadata for the popular file may be stored as data at the server, or may be stored as data elsewhere and accessible by the server. The metadata analysis methods may include typographical analysis, string matching and regular expressions.

Figure 3:
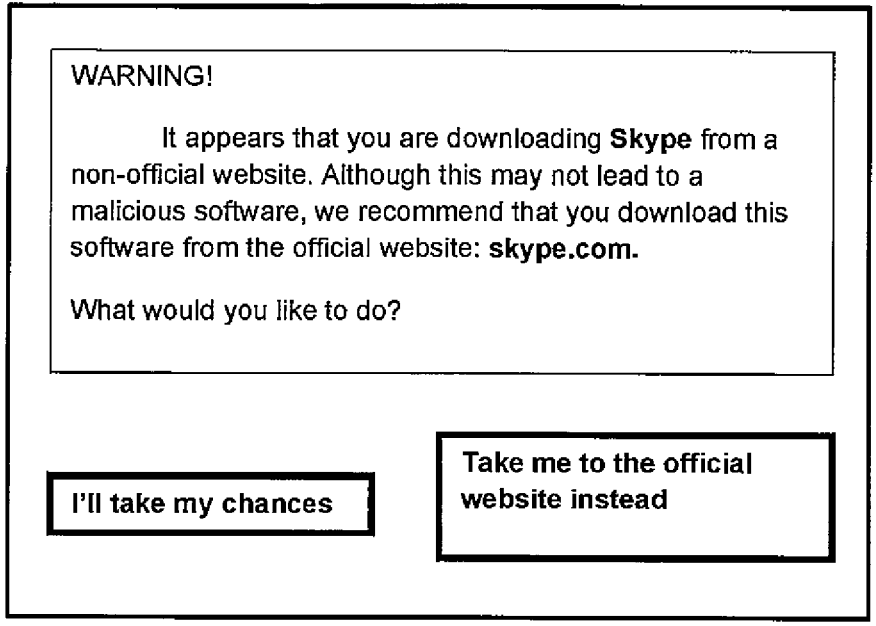
FIGS. 3 and 4 show an exemplary warning message to be sent to a user attempting to download an electronic file.
Figure 4:
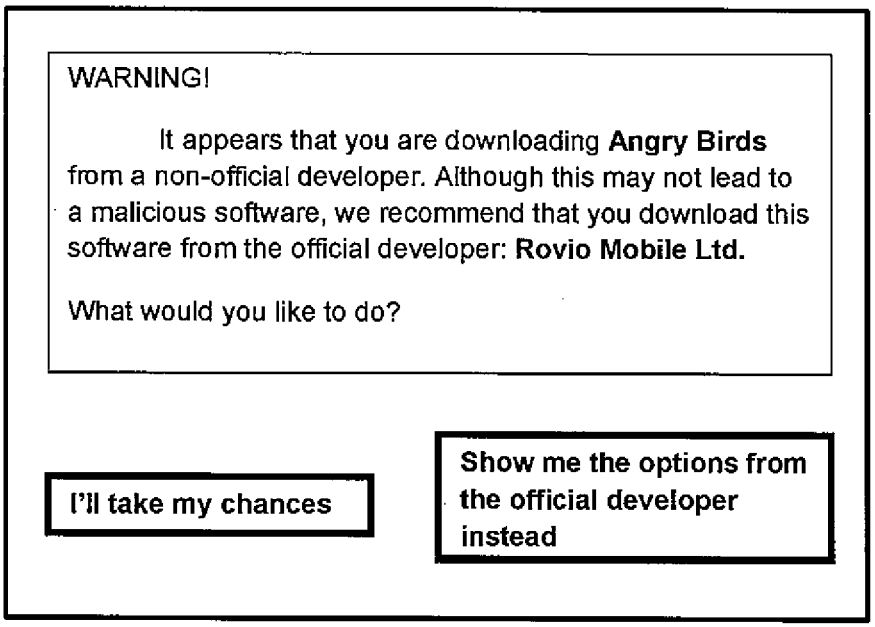

If it is determined at steps S7 and S8 that any of the metadata extracted from the file matches with any of the metadata stored on the server for a popular file, at step S9 the reputable source 4 (such as the official site) associated with the popular file is recommended to the user by sending a message from the server 3 to the user device 1. The recommendation may take the form illustrated in FIG. 3 or 4. The official website itself may be recommended to the user, as illustrated in FIG. 3. If more options are available from the official developer of an application that is associated with the file, an official site detailing these options may be recommended to the user, as illustrated in FIG. 4. The additional options may include websites such as Softpedia and Majorgeeks.

At step S10 it is determined if the user chose the recommended official site.

If the user chose the recommended official site, the URL and the metadata extracted from the file are sent to a backend system for rating (step S11). At step S12 the downloaded electronic file is deleted from the temporary location on the user device 1 and the download proceeds via the recommended official site.

If the user does not choose the recommended official site, at step S13 the downloaded file is moved from the temporary location on the user's device to a user download directory. Subsequently, the user is asked for feedback on the source of the file at step S14, and at step S15 the URL and the metadata extracted from the file is sent to a backend system for further analysis. The download process then proceeds via a normal file reputation handling process at step S26.

If it is determined at steps S7 and S8 that none of the metadata extracted from the electronic file matches with any of the metadata stored on the server for a popular file, the subsequent steps of the method form a process that may be used to decide if the file should be added to a list of popular files. In the case that the file is added to the list of popular files for which data and/or metadata may be available to the server 3, an association with an official site may be available for the electronic file for future download requests. At step S16 the number of instances that the electronic file has been queried in a predetermined preceding time period is counted. The queries that are counted may be download requests from users, and the predetermined time period may be, for example, 14 days. At step S17 it is determined whether a hit count (the hit count is the number of times that the electronic file has been encountered in the predetermined electronic period) has reached a popularity threshold, where the popularity threshold is a minimum hit count.

If the hit count has not reached the popularity threshold, the download proceeds via a normal file reputation handling process at step S26.

If the hit count has reached the popularity threshold, at step S18 the URL and the metadata extracted from the file are sent to a backend system where they may be included as data to be associated with the electronic file, which may be included in the list of popular files that is available to the server 3. The download then proceeds via a normal file reputation handling process at step S26.

Figure 5:
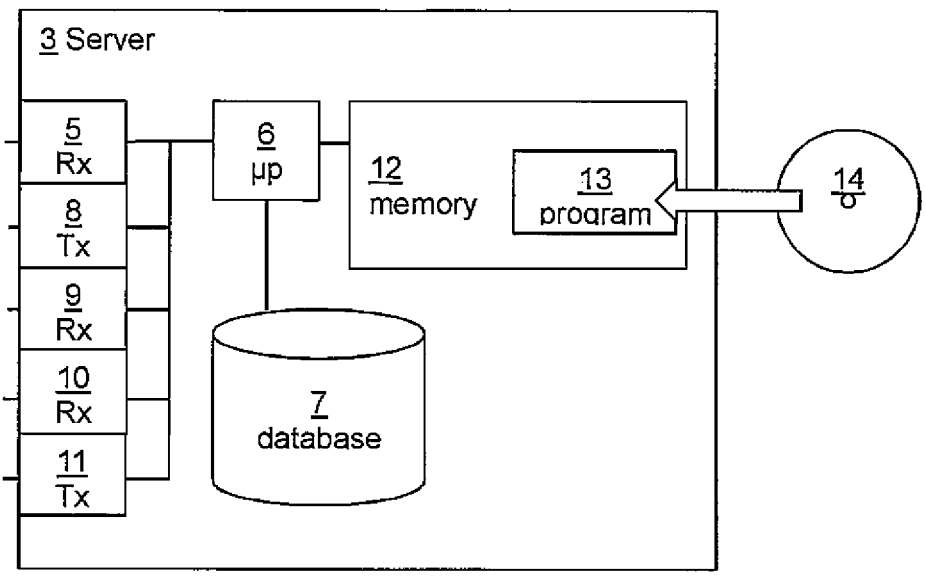
FIG. 5 illustrates schematically in a block diagram a server.

FIG. 5 shows an exemplary server 3. The server 3 is provided with a first receiver 5 that can receive a message from the user device 1 that includes an identity of the source from which the user device wishes to obtain the electronic file. A processor 6 is provided to compare the received identity of the source with an identity of a known reputable source associated with the electronic file. This may be done by querying a database 7. The database is shown in this example as being located at the server 4, but it will be appreciated that the server 3 could alternatively access a remote database. The database 7 contains information relating to known electronic files and reputable sources from which the known electronic files may be obtained.

A first transmitter 8 is provided for, in the event that the source and the known reputable source do not match, sending to the user device 1 a message recommending that the user device 1 obtains the electronic file from the known reputable source.

The server 3 may be provided with a second receiver 9 that can receive metadata relating to the file that has been extracted from a temporary download of the electronic file by the user device 1, as described above. The processor 6 in this case is arranged to determine if any of the received metadata matches metadata associated with a version of the electronic file available from the known reputable source. In the event that none of the received metadata matches metadata associated with a version of the electronic file available from the known reputable source, the processor 6 is further arranged to determine a number of enquiries within a predetermined time period from user devices relating to the first source. In the event that the number of enquiries exceeds a predetermined popularity threshold, the processor 6 is arranged to perform a further analysis on the electronic file available from the first source. In the event that the number of enquiries does not exceed a predetermined popularity threshold, the processor 6 is arranged to performing a normal file reputation handling process. Information about the number of enquires about the electronic file may be stored in the database 7 or a different database.

The server 3 may also be provided with a third receiver 10 arranged to receive from the user device 1 an indication that the user device did not obtain the electronic file from the recommended source. In this case, a second transmitter 11 is provided that is arranged to request further information about the electronic file from the user device for use in a reputation handling process.

In the above description, the server 3 is described as having different transmitters and receivers. It will be appreciated that these may be disposed in any suitable manner, for example in a single transmitter and receiver, a transceiver and so on. Similarly, a single processor 6 is described but it will be appreciated that the function of the processor may be performed by a single physical processor or by more than one processor.

The server 3 is also provided with a non-transitory computer readable medium in the form of a memory 12. The memory may be used to store a computer program 13 which, when executed by the processor 6, causes the processor 6 to perform the functions described above. Note that the computer program 13 may be provided from an external source 14 such as a carrier wave, a flash disk, a disk and so on.

Figure 6:
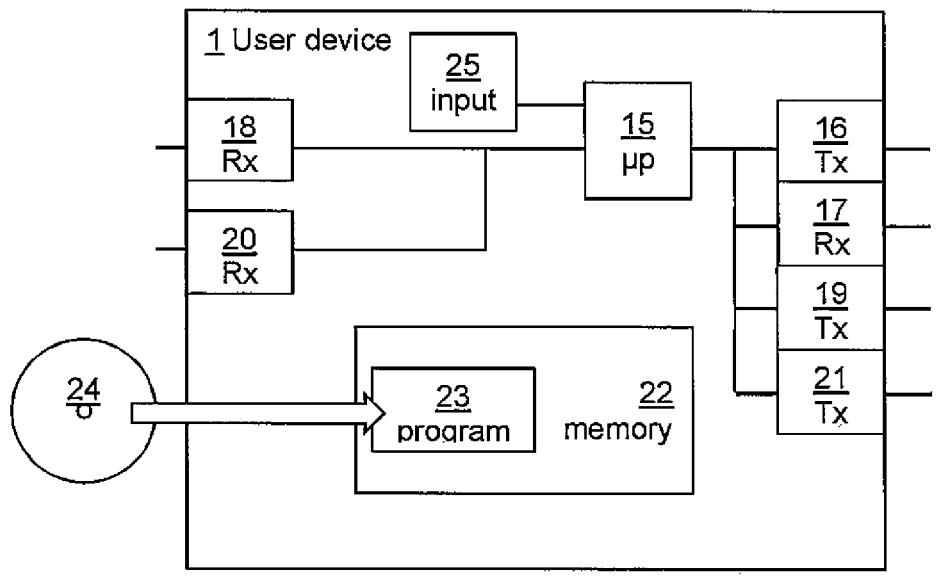
FIG. 6 illustrates schematically in a block diagram a user device.

Turning now to FIG. 6, there is shown an exemplary user device 1. A processor 15 is provided that is arranged to determine an identity of a first source from which an electronic file is available A first transmitter 16 is provided that is arranged to send to the identity of the electronic file and the identity of the source to the server 3. A first receiver 17 is also provided that is arranged to receive a response message from the server, the response message including an identity of a different, reputable source associated with the electronic file and from which the electronic file is available.

A second receiver 18 is provided that can obtain the electronic file from the source. In this case, the processor 15 is further arranged to obtain metadata relating to the electronic file, and a second transmitter 19 is arranged to send the obtained metadata to the server 3. The processor may obtain any suitable metadata as described above.

A third receiver 20 may be arranged to, after receiving the response message, obtain the electronic file from the source, in which case a third transmitter 21 is arranged to send to the server a further message, the further message including information about the obtained electronic file.

In the above description, the user device 1 is described as having different transmitters and receivers. It will be appreciated that these may be disposed in any suitable manner, for example in a single transmitter and receiver, a transceiver and so on. Similarly, a single processor 15 is described but it will be appreciated that the function of the processor may be performed by a single physical processor or by more than one processor.

The user device 1 is also provided with a non-transitory computer readable medium in the form of a memory 22. The memory may be used to store a computer program 23 which, when executed by the processor 15, causes the processor 15 to perform the functions described above. Note that the computer program 23 may be provided from an external source 24 such as a carrier wave, a flash disk, a disk and so on. The memory 22 may also be allocated a region for storing the downloaded electronic file for metadata extraction.

The user device 1 is also provided with a user input 25. This is used by the user to input information such as a selection of whether to download the electronic file from the recommended reputable source or from the source from which the user first attempted to obtain the electronic file.

Figure 7:
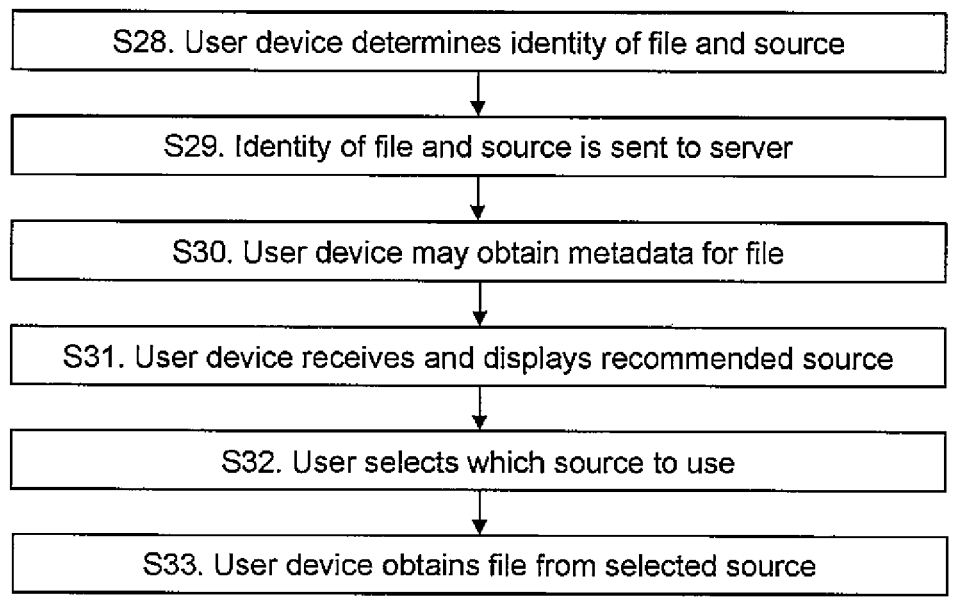
FIG. 7 is a flow diagram showing exemplary steps at a user device.

FIG. 7 is a flow diagram showing exemplary steps at the user device 1. The following numbering corresponds to that of FIG. 7:

S28. The user device 1 determines an identity of a source from which the electronic file is available.

S29. The identity of the electronic file and the identity of the source is sent to the server 3.

S30. If necessary, the user device 1 obtains a copy of the electronic file and extracts metadata from the electronic file. The extracted metadata is sent to the server 3.

S31. The user device 1 receives from the server a recommended reputable source from the server 3. This source is displayed to the user.

S32. The user uses the user input 25 to select the source from which to obtain the file (typically the recommended source or the original source).

S33. The user device 1 obtains the electronic file from the selected source.

As an alternative to steps S31 to S33, user device 1 may receive the recommended reputable source from the server 3 and then automatically download the file from the recommended source. This option does not require the user to take any action; the user device forces the download from the reputable source.

As a further alternative to steps S31 to S33, user device 1 may receive the recommended reputable source and may subsequently prevent download from any source other than the recommended source. The user may then choose not to download the file at all, or to continue download the file from the recommended source.

It will be appreciated by the person of skill in the art that various modifications may be made to the above described embodiment without departing from the scope of the present invention. For example, the database is described as being located at the server, but it will be apparent that the database may be located in a separate entity to the server, in which case the server will send queries remotely to the database.

The invention claimed is:

1. A method of controlling a download source for an electronic file, the method comprising, at a user device:
   determining an identity of a first source from which the electronic file is available;
   sending to a remote server the identity of the electronic file and the identity of the first source;
   obtaining the electronic file from the first source and storing it in a temporary location on the user device;
   obtaining metadata relating to the electronic file;
   sending the obtained metadata to the remote server;
   receiving from the remote server a response message including an identity of a different, reputable source associated with the electronic file and from which the electronic file is available;
   after receiving the response message deleting the electronic file obtained from the first source from the temporary location; and
   obtaining the electronic file from the reputable source.

2. The method according to claim 1, wherein the metadata comprises any of a filename, a file description, a product name, a copyright owner, an original filename, a digital signature, a developer name, a package name, an original domain and a hash value.

3. A computer program, comprising computer readable code which, when run on a user device, causes the user device to perform the method as claimed in claim 1.

4. A computer program product comprising a non-transitory computer readable medium and a computer program according to claim 3, wherein the computer program is stored on the computer readable medium.

5. A user device for use in a communications network, the user device comprising:
- a processor arranged to determine an identity of a first source from which an electronic file is available;
- a first transmitter arranged to send to a remote server the identity of the electronic file and the identity of the first source;
- a first receiver arranged to receive from the remote server a response message including an identity of a different, reputable source associated with the electronic file and from which the electronic file is available;
- a second receiver arranged to, prior to receiving the response message, obtain the electronic file from the first source, wherein the processor is further arranged to store the electronic file obtained from the first source in a temporary location on the user device, and to obtain metadata relating to the electronic file; and
- a second transmitter arranged to send the obtained metadata to the remote server,
- wherein the processor is further arranged to, after receiving the response message, delete the electronic file obtained from the first source from the temporary location on the user device and obtain the electronic file from the reputable source.

6. The user device according to claim 5, wherein the processor is arranged to obtain metadata selected from any of a filename, a file description, a product name, a copyright owner, an original filename, a digital signature, a developer name, a package name, an original domain and a hash value.

* * * * *